United States Patent
Tian et al.

(10) Patent No.: US 11,603,291 B2
(45) Date of Patent: Mar. 14, 2023

(54) HYDRAULIC BUFFER ENERGY STORAGE DEVICE AND SYSTEM FOR OVER-DISCHARGED HOIST SKIP IN VERTICAL SHAFT

(71) Applicant: Foshan University, Foshan (CN)

(72) Inventors: Ying Tian, Foshan (CN); Yang She, Foshan (CN); Xingbo Wang, Foshan (CN)

(73) Assignee: Foshan University, Foshan (CN)

( * ) Notice: Subject to any disclaimer, the term of this patent is extended or adjusted under 35 U.S.C. 154(b) by 0 days.

(21) Appl. No.: 17/847,616

(22) Filed: Jun. 23, 2022

(65) Prior Publication Data

US 2023/0012221 A1    Jan. 12, 2023

(30) Foreign Application Priority Data

Jul. 9, 2021  (CN) .......................... 202110777479.X

(51) Int. Cl.
  *B66B 5/28*  (2006.01)
  *B66B 17/08*  (2006.01)
  (Continued)

(52) U.S. Cl.
  CPC ............ *B66B 17/08* (2013.01); *B65G 63/027* (2013.01); *B65G 69/001* (2013.01); *B66B 5/16* (2013.01); *B66B 5/28* (2013.01)

(58) Field of Classification Search
  CPC .. B66B 5/282; B66B 5/00; B66B 5/28; B66B 5/16; B66B 17/08
  See application file for complete search history.

(56) References Cited

U.S. PATENT DOCUMENTS

| | | | | |
|---|---|---|---|---|
| 986,378 A | * | 3/1911 | Purlow | ...................... F16F 9/48 |
| | | | | 188/287 |
| 1,136,678 A | * | 4/1915 | Jansson | ................... B66B 5/028 |
| | | | | 91/392 |

(Continued)

FOREIGN PATENT DOCUMENTS

| | | |
|---|---|---|
| CN | 102305222 A | 1/2012 |
| CN | 102398837 A | 4/2012 |
| CN | 102701034 A | 10/2012 |

OTHER PUBLICATIONS

First Office Action issued in counterpart Chinese Patent Application No. 202110777479.X, dated Mar. 2, 2022.

*Primary Examiner* — Michael A Riegelman
(74) *Attorney, Agent, or Firm* — Westbridge IP LLC

(57) ABSTRACT

Disclosed is a hydraulic buffer energy storage device for an over-discharged hoist skip in a vertical shaft. The hydraulic buffer energy storage device for an over-discharged hoist skip in a vertical shaft comprises a vertical shaft, where a hoist skip is hung on an inner side of the vertical shaft, and a hydraulic buffer mechanism is arranged on the inner side of the vertical shaft; the hoist skip is positioned above the hydraulic buffer mechanism; the hydraulic buffer mechanism is communicated with an accumulator group, a pressure relief part and an oil replenishing part through an oil pipeline; the accumulator group is communicated with an energy storage part through an oil pipeline; the energy storage part, the pressure relief part and the oil replenishing part are respectively communicated with an oil tank through oil pipelines, the hydraulic buffer mechanism is connected with a displacement sensor.

4 Claims, 2 Drawing Sheets

(51) Int. Cl.
*B65G 69/00* (2006.01)
*B65G 63/02* (2006.01)
*B66B 5/16* (2006.01)

(56) References Cited

U.S. PATENT DOCUMENTS

| | | | | |
|---|---|---|---|---|
| 1,873,807 | A * | 8/1932 | Arnold | B66B 5/282 267/128 |
| 4,015,835 | A * | 4/1977 | Schumacher | B66B 5/282 188/287 |
| 4,635,907 | A * | 1/1987 | Bialy | F16F 9/06 267/221 |
| 4,926,981 | A * | 5/1990 | Bruehl | B66B 29/00 188/111 |
| 5,195,616 | A * | 3/1993 | Yoo | B66B 5/282 187/344 |
| 7,287,626 | B2 * | 10/2007 | Kigawa | B66B 5/282 267/221 |
| 9,688,513 | B2 * | 6/2017 | Zhu | B66B 5/28 |
| 2008/0142311 | A1 * | 6/2008 | Ferrisi | B66B 5/28 187/343 |
| 2015/0321884 | A1 * | 11/2015 | Kalliomäki | B66B 5/16 187/343 |

* cited by examiner

HYDRAULIC BUFFER ENERGY STORAGE DEVICE AND SYSTEM FOR OVER-DISCHARGED HOIST SKIP IN VERTICAL SHAFT

CROSS-REFERENCE TO RELATED APPLICATIONS

This application claims priority to Chinese Patent Application No. 202110777479.X, filed on Jul. 9, 2021, the entire contents of which are incorporated herein by reference.

TECHNICAL FIELD

The application belongs to the field of hoist skip over-discharge protection, and in particular relates to a hydraulic buffer energy storage device and a system for an over-discharged hoist skip in a vertical shaft.

BACKGROUND

In a process of vertical transportation with heavy load and long distance of a vertical shaft hoist, a wire rope of the shaft hoist is easy to be broken, especially when a hoist skip is lowered to a specified position underground. Due to an incomplete speed braking of the skip, the skip often hits an underground parking position at a certain speed, that is, the skip is over-discharge. In the conventional protection measures of skip over-discharge, anti-collision sleepers or rubber protective devices are often installed at designated parking places of the skip above the underground ground. When the over-discharge speed of the skip is too high (or the rope is broken), the conventional protective devices are difficult to absorb an impact energy of the skip over-discharge, which is easy to damage the underground equipment, causing unpredictable economic losses and casualties, and severely affecting the vertical transportation operation of the hoist skip.

SUMMARY

An objective is to provide a hydraulic buffer energy storage device and a system for an over-discharged hoist skip in a vertical shaft, so as to solve the above problems, brake an over-discharged hoist skip stably and safely, prevent the over-discharged hoist skip from generating excessive impact vibration, and prolong a service life of the hoist skip.

To achieve the above objective, the present application provides the following solutions:

a hydraulic buffer energy storage device for an over-discharged hoist skip in a vertical shaft comprises a vertical shaft, where a hoist skip is hung on an inner side of the vertical shaft; a hydraulic buffer mechanism is arranged on the inner side of the vertical shaft; the hoist skip is above the hydraulic buffer mechanism; hydraulic buffer mechanism is communicated with an accumulator group, a pressure relief part and an oil replenishing part through oil pipelines; the accumulator group is communicated with an energy storage part through an oil pipeline; the energy storage part, the pressure relief part and the oil replenishing part are respectively communicated with an oil tank through oil pipelines; the hydraulic buffer mechanism is connected with a displacement sensor, the accumulator group is connected with a pressure sensor, and the displacement sensor, the pressure sensor, the energy storage part and the oil replenishing part are electrically connected with a controller.

Optionally, the hydraulic buffer mechanism comprises at least two energy-absorbing hydraulic cylinders vertically and fixedly connected to a bottom of the vertical shaft, tops of telescopic rods of all the energy-absorbing hydraulic cylinders are fixedly connected with an anti-collision beam device, the displacement sensor is connected to all the telescopic rods, the rod cavities and rodless cavities of the energy-absorbing hydraulic cylinders are respectively communicated with the oil replenishing part through oil pipelines, the rodless cavities are respectively communicated with the accumulator group and the pressure relief part through oil pipelines, and an inner side of each rodless cavity is fixedly connected vertically with multiple springs.

Optionally, the oil replenishing part comprises a three-position four-way reversing valve, an oil port A of the three-position four-way reversing valve is communicated with the rodless cavity through an oil pipeline, an oil port B of the three-position four-way reversing valve is communicated with the rod cavity through an oil pipeline, the three-position four-way reversing valve is communicated with a pump source and a proportional overflow valve through oil pipelines, an oil outlet of pump source and an oil inlet of proportional overflow valve are both communicated with an oil port P of the three-position four-way reversing valve through oil pipelines, an oil inlet of the pump source, an oil port T of the three-position four-way reversing valve and an oil outlet of the proportional overflow valve are respectively communicated with the oil tank through oil pipelines, and the pump source, the three-position four-way reversing valve and the proportional overflow valve are electrically connected with the controller respectively.

Optionally, the pressure relief part comprises an oil replenishing one-way valve group and an overload relief valve, where an oil inlet of the oil replenishing one-way valve group and an oil outlet of the overload relief valve are respectively communicated with the oil tank through an oil pipeline, and an oil outlet of the oil replenishing one-way valve group and an oil inlet of the overload relief valve are respectively communicated with the rodless cavity through an oil pipeline.

Optionally, an oil inlet of the accumulator group is communicated with an oil outlet of an energy storage one-way valve group through an oil pipeline, an oil inlet of the energy storage one-way valve group is communicated with the rodless cavity through an oil pipeline, the pressure sensor is connected with an oil outlet of the accumulator group, and the oil outlet of the accumulator group is communicated with the energy storage part through an oil pipeline.

Optionally, the energy storage part comprises a two-position two-way reversing valve, an oil inlet of the two-position two-way reversing valve is communicated with the oil outlet of the accumulator group through an oil pipe, an oil outlet of the two-position two-way reversing valve is communicated with an oil inlet of a pressure reducing valve through an oil pipe, an oil outlet of the pressure reducing valve is communicated with an oil inlet of a motor through an oil pipeline, an oil outlet of the motor is communicated with the oil tank through an oil pipe, the motor is in transmission connection with an energy storage generator, and the two-position two-way reversing valve is electrically connected with the controller.

Optionally, a traction mechanism is arranged above the vertical shaft, and the traction mechanism comprises a driving element, and the driving element is in transmission connection with a winch; one end of a hoisting wire rope is wound on the winch, and the hoisting wire rope is also wound with a wire rope winder; the other end of the hoisting wire rope is fixedly connected with a top of the hoist skip, and the wire rope winder is positioned above the hoist skip and arranged outside the vertical shaft.

Optionally, a brake is arranged between the wire rope winder and the winch, and the hoisting wire rope passes through the brake.

The application provides a hydraulic buffer energy storage system for an over-discharged hoist skip in a vertical shaft. The hydraulic buffer energy storage system for an over-discharged hoist skip in a vertical shaft comprises an alarm, a monitor and the hydraulic buffer energy storage device for the over-discharged hoist skip in the vertical shaft.

The alarm, the monitor and the hydraulic buffer energy storage device for the over-discharged hoist skip in the vertical shaft are electrically connected in turn. The monitor is used for monitoring a working state of the hydraulic buffer energy storage device for the over-discharged hoist skip in the vertical shaft in real time. The alarm is used for sending out sound and light alarm when the working state is abnormal.

The application has the following technical effects: a main function of the hydraulic buffer mechanism to receive the energy from a falling hoist skip and transfer the energy to the accumulator group. When the energy is too large, the pressure relief part releases the excess energy which cannot be stored. A main function of the oil supplement part is to maintain the balance of hydraulic oil in the hydraulic buffer mechanism when the hydraulic buffer mechanism receives the energy of the hoist skip, and to prevent the hydraulic buffer mechanism from losing stability. Under overall cooperative action of the hydraulic buffer mechanism, the accumulator group, the pressure relief part and the oil supplement part, the energy from the hoist skip is absorbed, and the safety and stability of the device are ensured, so as to avoid accidents and affect the operation progress.

BRIEF DESCRIPTION OF THE DRAWINGS

In order to more clearly explain the embodiments of the present application or the technical solutions in the prior art, the following will briefly introduce the drawings that need to be used in the embodiments. Obviously, the drawings in the following description are only some embodiments of the present application. For those of ordinary skill in the art, other drawings can be obtained according to these drawings without any creative labor.

DETAILED DESCRIPTION OF THE EMBODIMENTS

The technical solutions in the embodiments of the present application will be clearly and completely described below with reference to the drawings in the embodiments of the present application. Obviously, the described embodiments are only part of the embodiments of the present application, but not all of them. Based on the embodiments of the present application, all other embodiments obtained by ordinary technicians in the field without creative labor are within the scope of the present application.

In order to make the above objectives, features and advantages of the present application more apparent and understandable, the present application will be explained in further detail below with reference to the drawings and detailed description.

Figure 1:
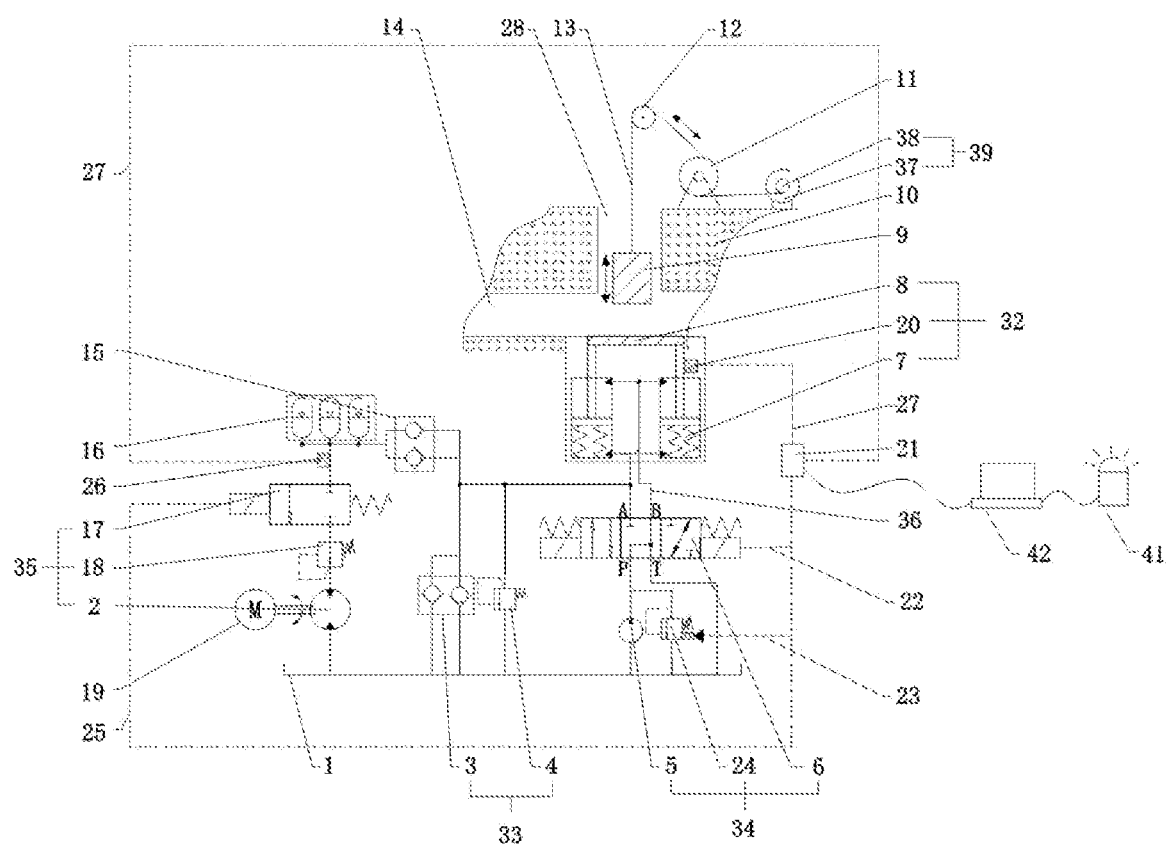
FIG. 1 is a schematic structural diagram according to the present application.
Figure 2:
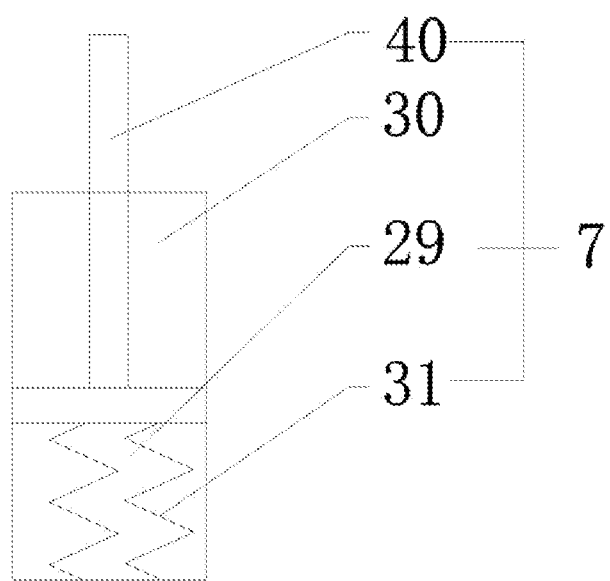
FIG. 2 is a schematic structure diagram of the energy-absorbing hydraulic cylinders according to the present application.

Referring to FIGS. 1-2, the present application provides a hydraulic buffer energy storage device for an over-discharged hoist skip in a vertical shaft 2. The hydraulic buffer energy storage device for over-discharged hoist skip of a vertical shaft 2 comprises a vertical shaft 2, where a hoist skip 9 is hung on an inner side of the vertical shaft 2, a hydraulic buffer mechanism 32 is arranged on the inner side of the vertical shaft 2, the hoist skip 9 is positioned above the hydraulic buffer mechanism 32, and the hydraulic buffer mechanism 32 is communicated with an accumulator group 16, a pressure relief part 33 and an oil replenishing part 34 through oil pipelines 36, and the accumulator group 16 is communicated with an energy storage part 35 through an oil pipeline. The energy storage part 35, the pressure relief part 33 and the oil replenishing part 34 are respectively communicated with the oil tank 1 through oil pipelines 36, the hydraulic buffer mechanism 32 is connected with a displacement sensor 20, the accumulator group 16 is connected with a pressure sensor 26, and the displacement sensor 20, the pressure sensor 26, the energy storage part 35 and the oil replenishing part 34 are electrically connected with a controller 21. A main function of the hydraulic buffer mechanism 32 to receive the energy from the falling of the hoist skip 9 and transfer the energy to the accumulator group 16. When the energy is too large, the pressure relief part 33 releases the excess energy which cannot be stored. A main function of the oil supplement part is to maintain the balance of hydraulic oil in the hydraulic buffer mechanism 32 when the hydraulic buffer mechanism 32 receives the energy from the hoist skip 9, and to prevent the hydraulic buffer mechanism 32 from losing stability. Under the overall cooperative action of the hydraulic buffer mechanism 32, the accumulator group 16, the pressure relief part 33 and the oil supplement part, the energy from the hoist skip 9 is absorbed, and the safety and stability of the device are ensured, so as to avoid accidents and affect the operation progress.

In a further optimization scheme, the hydraulic buffer mechanism 32 includes at least two energy-absorbing hydraulic cylinders 7 vertically and fixedly connected to a bottom of the vertical shaft 2, tops of telescopic rods of all the energy-absorbing hydraulic cylinders 7 are fixedly connected with an anti-collision beam device 8, and the displacement sensor 20 is connected to all the telescopic rods. Rod cavities 29 and rodless cavities 30 of the energy-absorbing hydraulic cylinders 7 are respectively communicated with the oil replenishing part 34 through an oil pipeline, the rodless cavities 30 are respectively communicated with the accumulator group 16 and the pressure relief part 33 through an oil pipeline, and an inner side of each rodless cavity is vertically and fixedly connected with a plurality of springs 31. In different action stages of the energy-absorbing hydraulic cylinders 7, the oil replenishing part 34 fills rod cavities 29 and rodless cavities 30 to realize the compression and reset action of the energy-absorbing hydraulic cylinders 7. The pressure relief part 33 is mainly for receiving and releasing the excess energy from the rodless cavities 30, and preventing the accumulator group 16 from exceeding its own energy absorption limit.

In a further optimized scheme, the oil replenishing part 34 includes a three-position four-way reversing valve 6, an oil port A of the three-position four-way reversing valve 6 is communicated with the rodless cavity through an oil pipeline, an oil port B of the three-position four-way reversing valve 6 is communicated with the rod cavity through an oil pipeline, the three-position four-way reversing valve 6 is communicated with a pump source 5 and a proportional overflow valve 24 through oil pipelines 36, and an oil outlet of the pump source 5 and an oil inlet of the proportional overflow valve 24 are both communicated with an oil port P of the three-position four-way reversing valve 6 through oil pipelines 36. An oil inlet of the pump 5, an oil outlet T of the three-position four-way reversing valve 6 and an oil outlet of the proportional overflow valve 24 are respectively communicated with the oil tank 1 through oil pipelines 36, and the pump source 5, the three-position four-way reversing valve 6 and the proportional overflow valve 24 are electrically connected with the controller 21 respectively. By starting the three-position four-way reversing valve 6, the hydraulic oil in the rod cavities 29 and the rodless cavities 30 is adjusted, thus realizing the stable state and safe reset of the energy-absorbing hydraulic cylinders 7 when compressed.

In a further optimization scheme, the pressure relief part 33 comprises an oil replenishing one-way valve group 3 and an overload relief valve 4. An oil inlet of the oil replenishing one-way valve group 3 and an oil outlet of the overload relief valve 4 are respectively communicated with the oil tank 1 through an oil pipeline, and an oil outlet of the oil replenishing one-way valve group 3 and an oil inlet of the overload relief valve 4 are respectively communicated with the rodless cavity through an oil pipeline. The oil replenishing one-way valve group 3 and the overload overflow valve 4 adjust an overload energy and transfer the overload energy to the oil tank 1. Meanwhile, the oil replenishing one-way valve group 3 also uses hydraulic oil of the oil tank 1 to replenish hydraulic oil for the device according to oil circuit conditions.

Further optimization scheme, an oil inlet of the accumulator group 16 is connected with an oil outlet of an energy storage one-way valve group 15 through an oil pipe, an oil inlet of the energy storage one-way valve group 15 is connected with the rodless cavity through an oil pipe, the pressure sensor 26 is connected with an oil outlet of the accumulator group 16, and the oil outlet of the accumulator group 16 is connected with the energy storage part 35 through an oil pipe. The energy storage one-way valve group 15 prevents the energy storage group 16 from reversely influencing the energy-absorbing hydraulic cylinders 7 when the energy storage group 16 converts energy.

In a further optimization scheme, the energy storage part 35 includes two-position two-way reversing valve 17, an oil inlet of the two-position two-way reversing valve 17 is communicated with the oil outlet of the accumulator group 16 through an oil pipe, an oil outlet of the two-position two-way reversing valve 17 is communicated with an oil inlet of the pressure reducing valve 18 through an oil pipe, an oil outlet of the pressure reducing valve 18 is communicated with an oil inlet of the motor 2 through an oil pipeline, an oil outlet of the motor 2 is communicated with the oil tank 1 through an oil pipe, the motor 2 is in transmission connection with an energy storage generator 19, and the two-position two-way reversing valve 17 is electrically connected with the controller 21.

In the further optimization scheme, a traction mechanism 39 is arranged above the vertical shaft 2, and the traction mechanism 39 includes a driving element 37, the driving element 37 is in transmission connection with a winch 38. One end of a hoisting wire rope 13 is wound on the winch 38, and a wire rope winder 12 is wound around the hoisting wire rope 13, and the other end of the hoisting wire rope 13 is fixedly connected with a top of the hoist skip 9, and the wire rope winder 12 is located above the hoist skip 9 and arranged outside the vertical shaft 2.

In a further optimization scheme, a brake 11 is arranged between the wire rope winder 12 and the winch 38, and the hoisting wire rope 13 passes through the brake 11.

In a further optimization scheme, an underground roadway 14 is horizontally arranged below the vertical shaft 2, and a bottom surface of the underground roadway 14 is flush with a top surface of the anti-collision beam device 8.

The application relates to a hydraulic buffer energy storage system for an over-discharged hoist skip in a vertical shaft 2. The hydraulic buffer energy storage system for an over-discharged hoist skip in a vertical shaft 2 comprises an alarm 41, a monitor 42 and the hydraulic buffer energy storage device for the over-discharged hoist skip in the vertical shaft 2.

The alarm 41, the monitor 42 and the hydraulic buffer energy storage device for the over-discharged hoist skip in the vertical shaft 2 are electrically connected in turn; the monitor 42 is used for monitoring a working state of the hydraulic buffer energy storage device for the over-discharged hoist skip in the vertical shaft 2 in real time; alarm 41 is used to give out sound and light alarm when the working state is abnormal.

The working process of this embodiment is as follows: in the initial state, the three-position four-way reversing valve 6 is in a middle position, and the hoist skip 9 transports vertically. If the hoist skip 9 fails to brake at a hanging position (or the rope is broken), the hoist skip 9 comes into front contact with the anti-collision beam device 8, an over-discharge impact occurs, the energy-absorbing hydraulic cylinder 7 is compressed, a piston moves downward, and the oil in the rodless cavity is squeezed into the accumulator group 16 through the energy storage one-way valve group 15, that is, storing an energy generated by collision between the hoist skip 9 and the anti-collision beam device 8. At the same time, the controller 21 collects downward displacement information of the piston through the displacement sensor 20, controls a spool of the three-position four-way reversing valve 6 to move to the left through a first line 22, and controls the proportional overflow valve 24 to overflow at low pressure through a second line 23, so as to realize the low-pressure oil supply of the pump source 5 to the rod cavity of the energy-absorbing hydraulic cylinder 7 and prevent the rod cavity of the energy-absorbing hydraulic cylinder 7 from sucking air.

When the pressure impact of the hoist skip 9 on the rodless cavity of the energy-absorbing hydraulic cylinder 7 is too large, that is, too much impact from the hydraulic oil in rodless cavity to the accumulator group 16, and the pressure of the oil inlet of the overload relief valve 4 is too large, the overload relief valve 4 absorbs and limits the pressure impact of the rodless cavity of the energy-absorbing hydraulic cylinder 7, and the excess hydraulic oil overflows to the oil tank 1 instantly, so as to realize the overload protection of the whole pipeline and the accumulator group 16.

At the same time, the controller 21 derives the piston displacement collected by the displacement sensor 20 and converts it into the piston speed value. When the anti-collision beam device 8 squeezes the piston of the energy-absorbing hydraulic cylinder 7 to a lowest position, its instantaneous speed value is zero. The controller 21 converts the signal of the displacement sensor 20 into a start signal and transmits it to the three-position four-way reversing valve 6 and the pump source 5. The spool of the three-position four-way reversing valve 6 is controlled to move to the right through the first line 22, the proportional overflow valve 24 is controlled to be at a high pressure through the second line 23, and the pump source 5 is controlled to supply high-pressure oil to the rodless cavity of the energy-absorbing hydraulic cylinder 7, and the piston of the energy-absorbing hydraulic cylinder 7 is pushed out to a position to be buffered.

The above-mentioned activity process of the energy-absorbing hydraulic cylinder 7 is repeated, and the oil in rodless cavity of the energy-absorbing hydraulic cylinder 7 continuously enters the accumulator group 16 through the energy storage one-way valve group 15 for storage, and the hydraulic energy of the accumulator group 16 continues to increase. The controller 21 collects the pressure of the accumulator group 16 in real time through the pressure sensor 26 and the fourth line 27, and when the pressure of the accumulator group 16 reaches a set value, the controller 21 controls the two-position two-way reversing valve 17 to start through a third line 25 to make it change direction. In this way, the hydraulic oil stored in the accumulator group 16 drives the motor 2 to rotate continuously, and then drives the energy storage generator 19 to generate electricity, thus completing small-scale electricity consumption such as underground lighting.

In the description of the present application, it should be noted that the orientation or position relationships indicated by the terms "longitudinal", "transverse", "upper", "lower", "front", "rear", "left", "right", "vertical", "horizontal", "top", "bottom", "inner", "outer" are based on the orientation or position relationships shown in the figures, which are only for the convenience of describing the present application, rather than indicating or implying that the device or elements must be in designated orientation, or configured or operated in designated orientation so that they cannot be understood as the limitation of this application.

The above-mentioned embodiments only describe the preferred mode of the application, but do not limit the scope of the application. On the premise of not departing from the design spirit of the application, all kinds of modifications and improvements made by ordinary technicians in the field to the technical scheme of the application shall fall within the scope of protection determined by the claims of the application.

What is claimed is:

1. A hydraulic buffer energy storage device for an over-discharged hoist skip in a vertical shaft, comprising a vertical shaft, wherein a hoist skip is hung on an inner side of the vertical shaft, a hydraulic buffer mechanism is arranged on the inner side of the vertical shaft; the hoist skip is above the hydraulic buffer mechanism; the hydraulic buffer mechanism is communicated with an accumulator group, a pressure relief part and an oil replenishing part through oil pipelines; the accumulator group is communicated with an energy storage part through an oil pipeline; the energy storage part, the pressure relief part and the oil replenishing part are respectively communicated with an oil tank through oil pipelines; the hydraulic buffer mechanism is connected with a displacement sensor, the accumulator group is connected with a pressure sensor, and the displacement sensor, the pressure sensor, the energy storage part and the oil replenishing part are electrically connected with a controller;
the hydraulic buffer mechanism comprises at least two energy-absorbing hydraulic cylinders vertically and fixedly connected to a bottom of the vertical shaft, tops of telescopic rods of all the energy-absorbing hydraulic cylinders are fixedly connected with an anti-collision beam device, the displacement sensor is connected to all the telescopic rods, rod cavities and rodless cavities of the energy-absorbing hydraulic cylinders are respectively communicated with the oil replenishing part through oil pipelines, the rodless cavities are respectively communicated with the accumulator group and the pressure relief part through oil pipelines, and an inner side of each rodless cavity is fixedly connected vertically with multiple springs;
the oil replenishing part comprises a three-position four-way reversing valve, an oil port A of the three-position four-way reversing valve is communicated with the rodless cavity through an oil pipeline, an oil port B of the three-position four-way reversing valve is communicated with the rod cavity through an oil pipeline, the three-position four-way reversing valve is communicated with a pump source and a proportional overflow valve through oil pipelines, an oil outlet of the pump source and an oil inlet of the proportional overflow valve are both communicated with an oil port P of the three-position four-way reversing valve through oil pipelines, an oil inlet of the pump source, an oil port T of the three-position four-way reversing valve and an oil outlet of the proportional overflow valve are respectively communicated with the oil tank through oil pipelines, and the pump source, the three-position four-way reversing valve and the proportional overflow valve are electrically connected with the controller respectively;
the pressure relief part comprises an oil replenishing one-way valve group and an overload relief valve, an oil inlet of the oil replenishing one-way valve group and an oil outlet of the overload relief valve are respectively communicated with the oil tank through an oil pipeline, and an oil outlet of the oil replenishing one-way valve group and an oil inlet of the overload relief valve are respectively communicated with the rodless cavity through an oil pipeline;
an oil inlet of the accumulator group is communicated with an oil outlet of an energy storage one-way valve group through an oil pipeline, an oil inlet of the energy storage one-way valve group is communicated with the rodless cavity through an oil pipeline, the pressure sensor is connected with an oil outlet of the accumulator group, and the oil outlet of the accumulator group is communicated with the energy storage part through an oil pipeline;
the energy storage part comprises a two-position two-way reversing valve, an oil inlet of the two-position two-way reversing valve is communicated with the oil outlet of the accumulator group through an oil pipe, an oil outlet of the two-position two-way reversing valve is communicated with an oil inlet of a pressure reducing valve through an oil pipe, an oil outlet of the pressure reducing valve is communicated with an oil inlet of a motor through an oil pipeline, an oil outlet of the motor is communicated with the oil tank through an oil pipe, the motor is in transmission connection with an energy storage generator, and the two-position two-way reversing valve is electrically connected with the controller.

2. The hydraulic buffer energy storage device for the over-discharged hoist skip in the vertical shaft according to claim 1, wherein a traction mechanism is arranged above the vertical shaft, and the traction mechanism comprises a driving element, and the driving element is in transmission connection with a winch; one end of a hoisting wire rope is wound on the winch, and the hoisting wire rope is also wound with a wire rope winder, the other end of the hoisting wire rope is fixedly connected with a top of the hoist skip, and the wire rope winder is positioned above the hoist skip and arranged outside the vertical shaft.

3. The hydraulic buffer energy storage device for the over-discharged hoist skip in the vertical shaft according to claim 2, wherein a brake is arranged between the wire rope winder and the winch, and the hoisting wire rope passes through the brake.

4. A hydraulic buffer energy storage system for an over-discharged hoist skip in a vertical shaft, comprising an alarm, a monitor and the hydraulic buffer energy storage device for the over-discharged hoist skip in the vertical shaft according to claim 1;
   wherein the alarm, the monitor and the hydraulic buffer energy storage device for the over-discharged hoist skip in the vertical shaft are electrically connected in turn, the monitor is used for monitoring a working state of the hydraulic buffer energy storage device for the over-discharged hoist skip in the vertical shaft in real time, the alarm is used for sending out sound and light alarm when the working state is abnormal.

\* \* \* \* \*